United States Patent [19]

Givens

[11] Patent Number: 5,115,574
[45] Date of Patent: May 26, 1992

[54] METHOD AND APPARATUS FOR MEASURING RISE IN HEIGHT OF A LIQUID COLUMN

[75] Inventor: Wyatt W. Givens, Dallas, Tex.

[73] Assignee: Mobil Oil Corporation, Fairfax, Va.

[21] Appl. No.: 703,449

[22] Filed: May 21, 1991

[51] Int. Cl.⁵ .................. B65B 1/30; G01F 23/24; H02P 5/00
[52] U.S. Cl. .................................. 33/714; 33/719; 73/304 R; 141/95; 318/482
[58] Field of Search ............ 73/304 R; 33/713, 716, 33/714, 719; 318/482; 141/95; 364/509

[56] References Cited

U.S. PATENT DOCUMENTS

| | | | |
|---|---|---|---|
| 2,053,938 | 9/1936 | Barker, Jr. | 33/716 |
| 2,483,333 | 9/1949 | Cannon, Jr. et al. | 33/714 |
| 3,781,624 | 12/1973 | Tullis | 33/714 X |
| 4,381,665 | 5/1983 | Levine et al. | 73/73 |
| 4,615,351 | 10/1986 | Schliefer et al. | 73/304 E |
| 4,672,840 | 6/1987 | Cullick | 73/38 |

Primary Examiner—Daniel M. Yasich
Attorney, Agent, or Firm—Alexander J. McKillop; Charles J. Speciale; George W. Hager, Jr.

[57] ABSTRACT

Electrical contact is made between an electrode and a liquid column to establish current flow between the electrode and the liquid column. The electrode is raised up the liquid column until electrical contact is broken. An additional quantity of liquid is added to the liquid column to cause the column to rise and make electrical contact with the electrode. The electrode is raised up the liquid column until electrical contact is again broken. The distance of travel of the electrode is measured as a determination of the rise in height of the liquid column and of the additional volume of liquid added to the column.

24 Claims, 2 Drawing Sheets

METHOD AND APPARATUS FOR MEASURING RISE IN HEIGHT OF A LIQUID COLUMN

BACKGROUND OF THE INVENTION

In industrial processes and research, there is often the need to measure with a high degree of precision and accuracy very small volumes of liquid. A small volume in this context is in the range of a few microliters to a few tens of milliliters. Measurement of such small volumes is now accomplished by collecting the liquid in either a volumetric pipet or a measuring pipet. Volumetric pipets are generally used to collect and transfer an exact total volume, e.g., 25 milliliters. A type A serialized precision pipet is accurate to within about ±0.1 percent of the total volume for total volumes in the range 10 to 50 milliliters. Volumetric pipets are generally nonlinear as can be seen in FIG. 1. The bore of the pipet 11 is not uniform. Such a volumetric pipet 11 is calibrated in terms of the volume between scribed marks $L_1$ and $L_2$. Measuring pipets are used to measure volumes less than the maximum volume capacity of the pipet. The accuracy of a measuring pipet is generally between 0.5 and 1 percent of the total volume. A measuring pipet, as illustrated in FIG. 2, is linear, i.e., the volume of a column of fluid is directly proportional to its length.

SUMMARY OF THE INVENTION

The present invention is directed to a method and apparatus for measuring the rise in height of a liquid column and for further using such measurements to determine the increase in volume of a liquid column by the addition of liquid to the column.

More particularly, a cylindrical liquid column is formed of an electrically conductive liquid. Electrical contact is effected between the liquid column and an electrode to establish current flow between the liquid column and the electrode. The electrode is raised to a reference position above and in juxtaposition with the surface of the liquid column at which contact between the electrode and the liquid column is broken, thereby causing current flow between the liquid column and the electrode to cease. An additional quantity of electrically conductive liquid is added to the liquid column to cause the surface of the liquid column to rise above the reference position of the electrode, thereby again causing current flow between the liquid column and the electrode. The electrode is then again raised to a second position above and in juxtaposition with the surface of the liquid column at which contact between the electrode and the liquid column is again broken, thereby again causing current flow between the electrode and the liquid column to cease. The distance of travel of the electrode between the reference and second positions is determined as a measure of the rise in height of the liquid column from the adding of an additional quantity of electrically conductive liquid to the liquid column.

In a more specific aspect, the electrode is connected to a rotatable device through a mechanical translating mechanism that converts the rotational motion of the device to linear movement of the electrode. A plurality of identifiable events are generated for each revolution of the rotatable device such that a fixed number of events correlate with a fixed amount of linear movement of the electrode. When the liquid column rises above such reference position, a current flow is initiated between the liquid column and the electrode. In response to this current flow, rotation of the rotatable device is started, thereby causing the electrode to be linearly moved up the liquid column by the mechanical translating mechanism. Rotation of the rotatable device is stopped in response to the cessation of current flow between the liquid column and the electrode when the electrode is moved to the second position above and in juxtaposition with the surface of the increased height liquid column. The number of detected identifiable events is correlated with the fixed number of events per unit of linear travel of the electrode between its reference and second positions as a measure of the increase in height of the liquid column.

In a further aspect the rotatable device is encoded and a plurality of identifiable pulses are produced in response to each rotation of the encoded device.

In a still further aspect the mechanical translating mechanism is a lead screw fixed in axial position parallel to the liquid column and rotated by a motor. A nut moves linearly along the rotating leas screw without itself rotating and is mechanically linked to the electrode for moving the electrode normal to the surface of the liquid column as the motor turns the lead screw.

In a yet further aspect, the increase in volume of a liquid column following the addition of an unknown volume of liquid is determined by a correlation of the column's measured increase in height with a measured increase in height of a liquid column following the addition of a known volume of liquid.

DESCRIPTION OF THE PREFERRED EMBODIMENT

Figure 3:
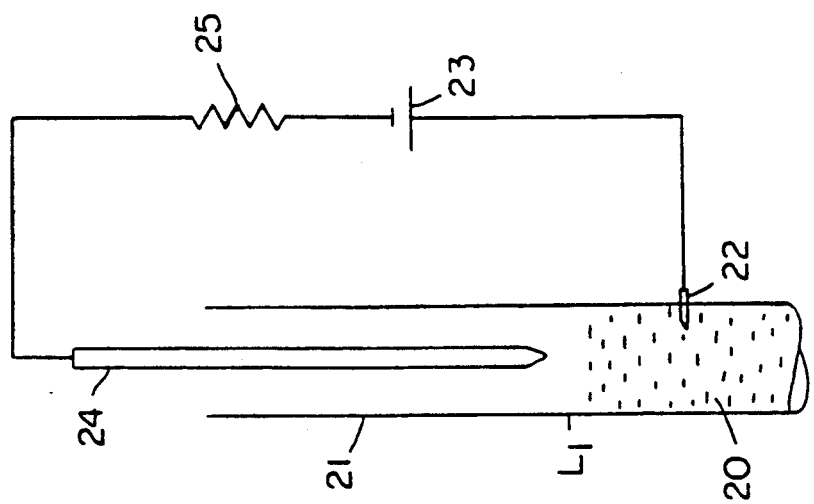
FIGS. 3 and 4 illustrate apparatus for carrying out liquid column measurements in accordance with the present invention.
Figure 2:
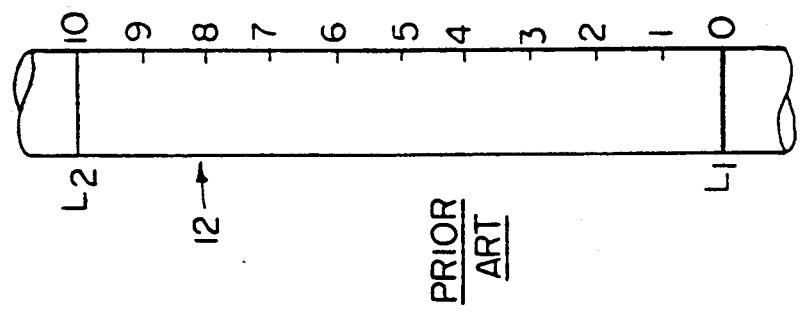
FIGS. 1 and 2 illustrate volumetric measuring devices of the prior art.
Figure 1:
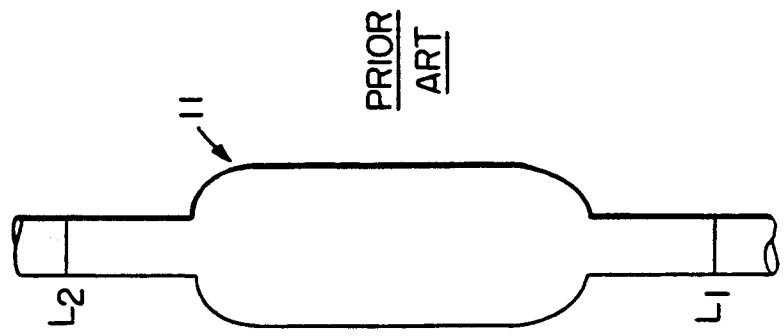

Referring now to FIG. 3 there is illustrated apparatus for se in measuring the rise in height of a liquid column from the adding of addition liquid to the column. An initial liquid column 20 of an electrically conductive liquid is contained in a cylindrical container 21. A fixed electrode 22 is in contact with the liquid column and connects to voltage source 23. In series with voltage source 23 is a resistor 25 and a moveable electrode 24. As shown in FIG. 3, electrode 24 is above the surface of the liquid column, consequently there is no electrical contact between electrode 24 and the liquid column 20. When additional electrically conductive liquid is added to the liquid column 20 to cause it to rise to a point where there is contact between electrode 24 and the liquid column 20 current flow is initiated through the electrical circuit formed by the voltage source 23, resistor 25, electrodes 22 and 24, and the liquid column 20. Thus electrode 24 and the liquid column 20 not as an "on-off" switch in the circuit. The making of contact between electrode 24 and liquid column 20 turns the circuit on and a current flow is initiated. The breaking of such contact turns the circuit off and current flow ceases. Current flow through resistor 25 can be monitored and used to activate or deactivate other electrical circuits as will be described hereinbelow.

It is to be noted that such making and breaking of the electrical circuit can be effected by raising and lowering of either the electrode 24 or the level of the liquid column 20.

Figure 4:
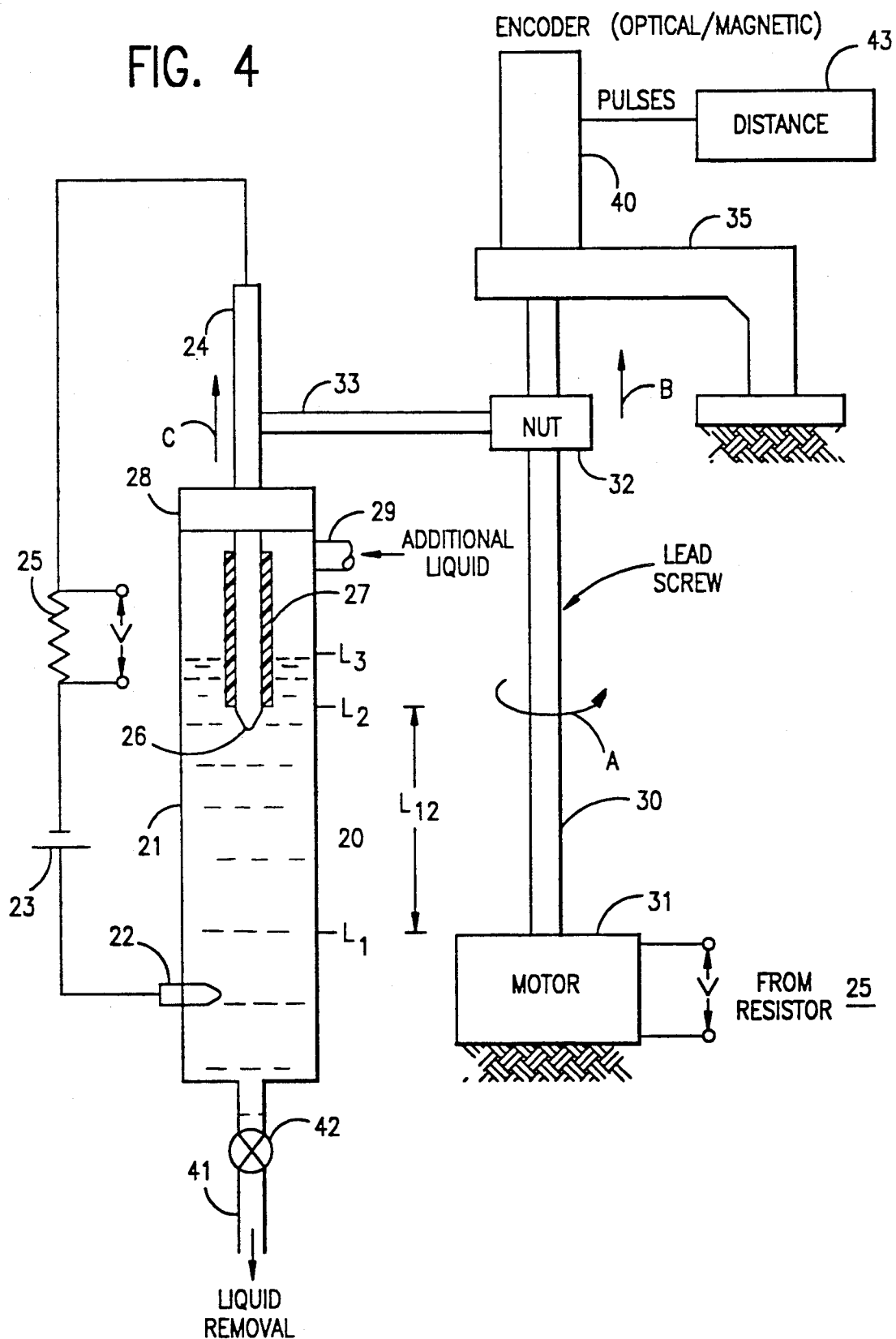

Referring now to FIG. 4, there is illustrated apparatus for raising and lowering the electrode 24 into and out of contact with liquid column 20 in carrying out the method of the present invention. A rotatable device such as lead screw 30, for example, is rotated by a direct current motor 31, as shown by arrow A, so as to advance a nut 32 linearly, as shown by arrow B, along the length of lead screw 30. Nut 32 is affixed to a linkage 33 which together function as a mechanical translating mechanism for translating rotational movement of lead screw 30 to linear movement of electrode 24, as shown by arrow C, through a bushing 28, parallel to the cylindrical axis of the container 21 While one end of lead screw 30 is affixed at motor 31, the other end is supported by frame 35 and connected to shaft encoder 40 which functions to monitor a count of the number of rotations of the lead screw 30 during the carrying out of the method of the present invention.

Having now described the apparatus of FIG. 4, a detailed description will now be made of the use of such apparatus in accordance with the present invention of measuring the rise in height of the liquid column by the adding of additional liquid to the column. For a linear and uniform bore of the cylindrical container, or pipet 21, such a measured rise in height of a liquid column is directly proportional to the volume of liquid added to the column which caused such rise in height. Thus, the smallest volume that can be measured is determined by the shortest length or increased height of the liquid column that can be measured.

Firstly, the system must be calibrated with the liquid column at an initial height or reference level $L_1$ as shown marked in FIG. 4 on the side of the cylindrical container 21. Electrode 24 is positioned at or in juxtaposition with the surface of the initial liquid column at $L_1$, whereby there is no electrical contact between liquid column 20 and electrode 24 and, consequently, no current flow between them. Motor 31 is energized to rotate lead screw 30 so as to cause electrode 24 to be lowered until it contacts the surface of liquid column 20 at the level $L_1$. As electrode 24 makes electrical contact with liquid column 20 current flow is initiated and a voltage V is developed across resistor 25. In response to this voltage, rotation of motor 31 is reversed in direction to cause the electrode 24 to be raised to a point at or in juxtaposition with the surface liquid column at $L_1$ at which electrical contact is broken between electrode 24 and liquid column 20. At this point current flow ceases, the voltage V across resistor 25 drops to zero and motor 31 is stopped, thereby stopping the raising of electrode 24 at such a point at or in juxtaposition with surface level of the liquid column at $L_1$. It is this position of the electrode 24 that is defined as the reference level of the electrode. The starting and stopping of motor 31 in response to the starting and stopping of current flow between the liquid column 20 and electrode 24 can be effected in various modes of operation. For example, several combinations of way of starting and stopping the motor 31 may be used: i) to start the motor under programmed controlled and to stop the motor automatically in response to the development of voltage V across resistor 25 for automated measurements, ii) to manually start and automatically stop the motor for set-up, calibration and manual measurements, iii) to manually start and manually stop the motor for set-up and operational checks, and iv) to automatically start and automatically stop the motor.

To effectively stop the linear movement of electrode 24 at level $L_1$ so as to obtain maximum precision in the measurements of the present invention the wetting surface area of electrode 24 that makes contact with the liquid column must be minimized so that none of the liquid will adhere to the electrode. More particularly, for a wetting surface of electrode 24 the surface tension of a liquid column causes the liquid to be stretched. As it is stretched it becomes thinner and finally breaks and returns to the surface of the liquid column. Due to this so called "pinch-off" of the liquid at the tip 26 of the electrode 24, current flow between the liquid column and the electrode 24 stops only after the electrode 24 is at some distance above the surface of the liquid column, thus introducing error into the measurements to be made. In addition, some liquid will be lost to a wetting surface and will introduce additional error by actually removing some of the liquid, even though a small amount, from the liquid column. In contrast, a non-wetting surface of electrode 24 does not allow for liquid adhesion and the "pinch-off" occurs for all practical purposes at or in juxtaposition with the surface level $L_1$ of the liquid column.

In some measurements, brine is produced at a very slow rate and the volumes are very small. The brine is collected over a long period of time and, to prevent loss of water due to evaporation, a thin layer of an oil (preferably n-Hexadecine) may be placed on top of the column of brine. For this measurement, the electrode 24 must be non-wetting to both oil and water. The electrode 24 can be made non-wetting by coating it with a layer of non-wetting material 27, as shown sectionalized in FIG. 4, such as Dupont products TFE 851-224 or TFE 851-255. Liquid will therefore not adhere or collect in small droplets to electrode 24. Since the electrode 24 must conduct electric current and the non-wetting surface is a good electrical insulator, the ends of the electrode 24 must not be so coated. One end must be exposed for making electrical connection through the resistor 25 and voltage source 23 to the fixed electrode 22. The other end must be exposed for making electrical contact with the liquid column 20. The end making contact with the liquid column may preferably be pointed with, only the tip 26 of the end not coated with the non-wetting material 27 in order to minimize the surface area of metal that contacts the liquid. The metal should preferably be corrosion resistant.

Having established the reference position for electrode 24, the apparatus is calibrated as follows: A known volume $V_c$, or calibration volume, of electrically conductive liquid is added to the liquid column 20 to raise its height to a new level at $L_3$. This causes contact and current flow between electrode 24 and liquid column 20. Such current flow develops the voltage V across resistor 25. Electrode 24 is thereby raised up the liquid column 20 to the level $L_2$ at which contact is broken and current flow ceases between electrode 24 and liquid column 20. Level $L_2$ is less than level $L_3$ due to the volume of liquid displaced by the electrode 24. As described above when such current flow ceases, motor 31 is stopped so as to position electrode at or in juxtaposition with surface level of the liquid column at $L_2$. Concurrently with the liquid column being raised to level $L_3$, the electrode 24 is preferably raised under a manual control mode of operation such that only a small volume of liquid is displaced by the tip of the electrode. Movement of electrode 24 is manually stopped with only the tip 26 of the electrode being in the liquid column. In one embodiment, the electrode has an outside diameter of a quarter inch for stability and is about eight inches in length. The tip 26 is about one-sixteenth of an inch diameter tapered to a very sharp point and is about one inch in length. If the total electrode were immersed in the liquid column, the length of the pipet would have to be much longer than is required in order to contain the liquid volume $V_c$. This would increase the total length of the apparatus and the lead screw 30 in particular, the shorter the lead screw length the better the stability of the electrode movement. The raising of electrode 24 is thereafter stopped, preferably automatically, when current flow ceases. In this manner of operation, the level $L_3$ will be only slightly higher than level $L_2$.

At this level $L_2$, electrode 24 has been raised, or traveled, a distance $L_{12}$ and this distance is directly proportional to the calibration volume of additional liquid added to the liquid column to cause it to rise from level $L_1$ to level $L_2$. More particularly, $$V_c = (\pi d^2/4) L_{12}.$$

where d is the inside diameter of the cylindrical container 21.

Since electrode 24 and nut 32 are affixed by the linkage 33, they travel the same distance $L_{12}$. This distance is directly related to the pitch of lead screw 30, that is, the total number of rotations of the lead screw plus any fraction of a rotation required to produce the distance $L_{12}$. The key to precision distance measurement is the encoder 40 and distance calculator 43. Such encoder produces a sequence of evenly spaced high-low voltage pulses as the lead screw 30 rotates. The interval between successive high and low voltage pulses corresponds to an exact increment of rotation of the lead screw 30. If the number of such pulses per revolution is N, then the incremental rotation in degrees per pulse is $360°/N$. If $N = 200$, for example, then the interval between successive high or low voltage pulses is 1.8 degrees. Several suitable optical shaft encoders are available such as the K15 series encoders from Datametrics Dresser, Wilmington, MS and the REX-32 series encoders from Restner Electronics Industries, Inc., Niagara Falls, NY. Encoders are available that produce as few as 50 pulses per revolution to several thousand pulses per revolution. Distance calculator 43 can be any microprocessor or computer that relates the number of pulses from encoder 40 to distance $L_{12}$ as described in detail above.

For purpose of illustrating the above, assume, for example, that a volume of liquid added to the initial liquid column is exactly 20 milliliters and the liquid column length $L_{12}$ is 201.52 millimeters. Further assume that the pitch of the lead screw 31 is one millimeter and the encoder 40 produces 200 pulses per revolution of lead screw 30. An encoder 40 that makes one revolution per revolution of a lead screw with a one millimeter pitch would produce 40,304±1 pulses for a nut 32 travel of 201.52 millimeters. Thus by counting the pulses from the encoder, the distance traveled by the nut and electrode can be measured to within ±0.005 millimeters with the apparatus described above. It should be noted that it is not necessary to calibrate in terms of liquid volume per increment of length, but calibration can be expressed in terms of the number of pulses, that is, in terms of volume per pulse. In the foregoing example, the volume of 20 milliliters would be either (i) 0.09925 milliliters per millimeter (i.e. 20 milliliters/201.52 millimeters) or (ii) 0.000495 milliliters per pulse (i.e. 20 milliliters/40,304 pulses). This would be the measurement that could be made for the above example.

By utilizing the method and apparatus of the present invention to measure column height of a known volume of liquid accurately in very small distance increments, a much more precise and accurate measurement is possible than with visual or other prior art measurement techniques. Further, an increase in volume o the liquid column 20 following the addition of an unknown volume of liquid to container 21 through inlet 29 may be determined by measuring the increase in height of column 20, removing the unknown volume of liquid from the container 21 through outlet 40 by opening valve 41, by adding a known volume of liquid to container 21 through inlet 29 after valve 451 is closed, measuring the increase in height of column 20, and finally correlating the column's measured increase in height for the unknown volume of additional liquid with the column's measured increase in height for the known volume of additional liquid.

Having now illustrated and described a preferred embodiment for the method and apparatus of the present invention, it is to be understood that numerous modifications or alterations may be made without departing from the spirit and scope of the invention as set forth in the appended claims.

What is claimed is:

1. A method for measuring the rise in height of a liquid column, comprising the steps of:
   a) forming an electrically conductive, cylindrical liquid column,
   b) effecting electrical contact between said liquid column and an electrode to establish current flow between said liquid column and said electrode,
   c) raising said electrode to a reference position in juxtaposition with the surface of said liquid column at which contact between said electrode and said liquid column is broken, thereby causing current flow between said liquid column and said electrode to cease,
   d) adding an additional quantity of an electrically conductive liquid to said liquid column, to cause the surface of said liquid column to rise to a height above said reference position of said electrode, thereby-causing said current flow between said liquid column and said electrodes,
   e) raising said electrode to a second position in juxtaposition with the surface of said liquid column at which contact between said electrode and said liquid column is broken, thereby causing current flow between said liquid column and said electrode to cease, and
   f) determining the distance of travel of said electrode between said reference and second positions as a measure of the rise in height of said liquid column from the adding of said additional quantity of electrically conductive liquid to said liquid column.

2. The method of claim 1 wherein the step of determining the distance of travel of said electrode between said reference and second positions as a measure of the rise in height of said liquid column comprises the steps of:

a) connecting said electrode to a rotatable device through a mechanical translating mechanism that converts the rotational motion of said device to a linear movement of said electrode, b) generating a plurality of identifiable events for each revolution of said rotatable device such that a fixed number of said events correlate with a fixed distance of linear movement of said electrode, c) starting the rotation of said rotatable device when said electrode is located at said reference position and current flow is initiated between said liquid column and said electrode to move said electrode linearly along said liquid column by means of said mechanical translating mechanism, d) stopping the rotation of said rotatable device in response to the cessation of current flow between said liquid column and said electrode when said electrode is moved to said second position, e) detecting the number of said identifiable events generated during the movement of said electrode from said reference position to said second position; and f) correlating the number of detected identifiable events with the fixed number of events per unit of linear travel of said electrode from step (b) as a measure of the distance of travel of said electrode from said reference position to said second position.

3. The method of claim 2 wherein the steps of generating and detecting said identifiable events comprise the steps of:

a) producing a plurality of identifiable pulses for each revolution of said rotatable device, and b) counting the number of said pulses produced during the travel of said electrode between said reference and second positions.

4. The method of claim 3 wherein the step of producing said pulses includes the optical encoding of said rotatable device and the production of electrical pulses in response to the rotation of the optically encoded rotatable device.

5. The method of claim 3 wherein the step of producing said pulses includes the magnetic encoding of said rotatable device and the production of electrical pulses in response to the rotation of the magnetically encoded rotatable device.

6. The method of claim 1 further comprising the step of coating all but a portion of said electrode that makes contact with said liquid column with a non-wetting material to minimize the wetting surface area of said electrode that contacts said liquid column.

7. The method of claim 6 wherein said material is non-wetting to water.

8. The method of claim 6 wherein said material is non-wetting to oil.

9. The method of claim 6 wherein said material is non-wetting to water and oil.

10. A method for measuring an increase in volume of a liquid column, comprising the steps of:

a) forming an electrically conductive, cylindrical liquid column, b) effecting electrical contact between said liquid column and an electrode to establish a current flow between said liquid column and said electrode, c) raising said electrode to a reference position in juxtaposition with the surface of said liquid column at which contact between said electrode and said liquid column is broken, thereby causing current flow to cease between said liquid column and said electrode.

d) adding a first quantity of an electrically conductive liquid to said liquid column to cause the surface of said liquid column to rise above said reference position of said electrode thereby causing current flow between said liquid column and said electrode, said second liquid quantity being of known volume, e) raising said electrode to a second position in juxtaposition with the surface of said liquid column at which contact between said second electrode and said liquid column is broken and current flow between said liquid column and said electrode ceases, f) determining the distance of travel of said electrode between said reference and second positions, said distance of travel being proportional to the known volume of said first liquid quantity, g) removing said first liquid quantity from said liquid column, h) moving said electrode to said reference position in juxtaposition with the surface of said liquid column, i) adding a second quantity of an electrically conductive liquid to said liquid column to cause the surface of said liquid column to rise above said reference position of said electrode thereby causing current flow between said liquid column and said electrode, said third liquid quantity being of unknown volume, j) raising said electrode to a third position in juxtaposition with the surface of said liquid column at which contact between said electrode and said liquid column is broken, thereby causing current flow between said liquid column and said electrode to cease, k) determining the distance of travel of said electrode between said reference and third positions, and l) correlating the distance of travel of said electrode determined from step (k) with the distance of travel of said electrode determined from step (f) and the known volume of said second liquid quantity to identify the unknown volume of said third liquid quantity.

11. The method of claim 10 wherein the steps of determining the distance of travel of said electrode between said reference and second positions as a measure of the rise in height of said liquid column comprises the steps of:

a) connecting said electrode to a rotatable device through a mechanical translating mechanism that converts the rotational motion of said device to a linear movement of said electrode, b) generating a plurality of identifiable events for each revolution of said rotatable device such that a fixed number of said events correlate with a fixed unit of linear movement of said electrode, c) starting the rotation of said rotatable device when said electrode is located at said reference position and current flow is initiated between said liquid column and said electrode to move said electrode linearly along said liquid column by means of said mechanical translating mechanism, d) stopping the rotation of said rotatable device in response to the cessation of current flow between said liquid column and said electrode when said electrode is moved to said second position, e) detecting the number of said identifiable events generated during the movement of said electrode from said reference position to said second position, and f) correlating the number of identifiable events with the fixed number of events per unit of linear travel of said electrode from step (b) as a measure of the distance of travel of said electrode from said reference position to said second position.

12. The method of claim 10 further comprising the step of coating all but a portion of said electrode that makes contact with said liquid column with a non-wetting material to minimize the wetting surface area of said electrode that contacts said liquid column.

13. The method of claim 12 wherein said material is non-wetting to water.

14. The method of claim 13 wherein said material is non-wetting to water.

15. Apparatus for measuring rise in height of a liquid column, comprising:

a) an electrically conductive liquid column, b) an electrode, c) a rotatable device with mechanical translating means for converting rotational motion of said device to linear movement of said electrode in a direction normal to the surface of said liquid column.

d) means for generating a plurality of identifiable events in response to rotation of said device such that a fixed number of said identifiable devents correlate with a fixed unit of linear movement of said electrode.

e) means for causing current flow between said liquid column and said electrode when said electrode is in electrical contact with said liquid column.

f) a motor for turning said rotatable device so as to move said electrode in said normal direction toward the surface of said liquid column to a first position at which a change is effected in electrical contact between said liquid column and said electrode.

g) means for increasing the height of said liquid column by the addition of electrically conducive liquid to said liquid column to cause it to rise above said first position, h) means for starting said rotatable device to move said electrode in said normal direction toward the surface of said liquid column to a second position at which a change is effected int he electrical contact between said liquid column and said electrode.

i) means for detecting the member of identifiable events generated during the movement of said electrode between said first and second positions. and j) means for correlation the number of detected identifiable events with the fixed number of identifiable events per unit of linear movement of said electrode from said first position to said second position as a measure of the increase in height of said liquid column.

16. The apparatus of claim 15 wherein said generating means provides a plurality of high-low voltage pulses in response to the turning of said rotatable device.

17. The apparatus of claim 15 wherein said generating means is an optical encoder.

18. The apparatus of claim 15 wherein said rotatable device comprises:

a) a motor b) a lead screw fixed in an axial position parallel to said liquid column and rotated by said motor, and c) a nut which moves linearly along said lead screw without rotating and is mechanically linked to said electrode for moving said electrode normal to the surface of said liquid column as said motor turns said lead screw.

19. The apparatus of claim 15 wherein said electrode is coated with a non-wetting material along a substantial portion of the end of said electrode that contacts said liquid column to minimize the wetting surface area of said end of said electrode that contacts said liquid column.

20. The apparatus of claim 19 wherein said material is non-wetting to water.

21. The apparatus of claim 19 wherein said material is non-wetting to oil.

22. The apparatus of claim 19 wherein said material is non-wetting to water and oil.

23. The apparatus of claim 19 wherein said electrode is in the form of a taper at the end of said electrode that contacts said liquid column and that portion of said end other than said taper is coated with a non-wetting material to minimize the wetting surface area of said electrode that contacts said liquid column.

24. The apparatus of claim 23 wherein all but a tip of said taper is coated with said non-wetting material.

* * * * *